(No Model.)

E. M. HELLWIG.
ELECTRIC BRUSH.

No. 604,471.

Patented May 24, 1898.

Witnesses:
W. J. Jacker.
O. A. Duggan.

Inventor:
Emma M. Hellwig.
By Chas. C. Tillman.
Atty.

UNITED STATES PATENT OFFICE.

EMMA M. HELLWIG, OF CHICAGO, ILLINOIS.

ELECTRIC BRUSH.

SPECIFICATION forming part of Letters Patent No. 604,471, dated May 24, 1898.

Application filed December 11, 1896. Serial No. 615,268. (No model.)

*To all whom it may concern:*

Be it known that I, EMMA M. HELLWIG, a subject of the Emperor of Germany, residing at Chicago, in the county of Cook and State of Illinois, have invented certain new and useful Improvements in Electric Brushes, of which the following is a specification.

This invention relates to improvements in that class of brushes used for therapeutical purposes in which a current of electricity is produced by chemical action or by means of a galvanic or voltaic battery; and it consists in certain peculiarities of the construction, novel arrangement, and operation of the various parts thereof, as will be hereinafter more fully set forth and specifically claimed.

In order to enable others skilled in the art to which my invention pertains to make and use the same, I will now proceed to describe it, referring to the accompanying drawings, in which—

Figure 1:
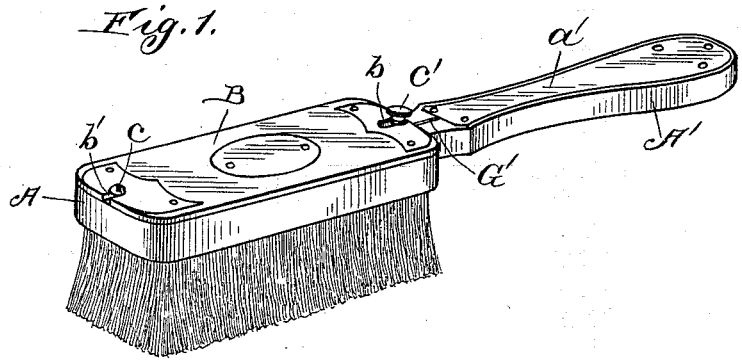
Figure 2:
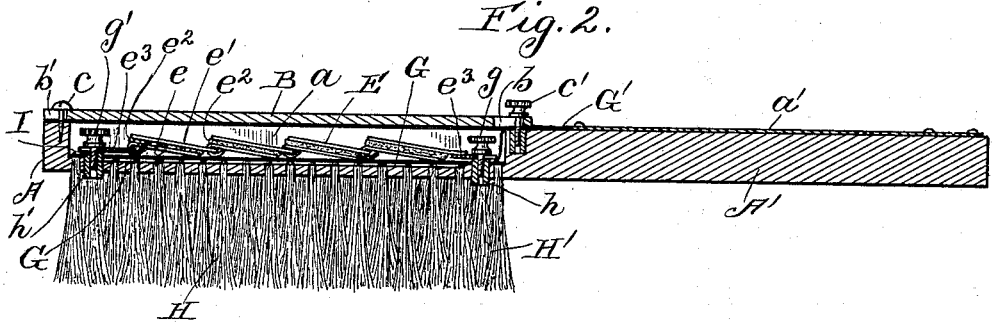
Figure 3:
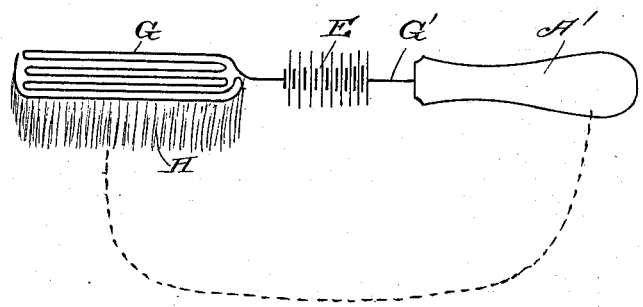

Figure 1 is a perspective view of my brush, showing it as it appears when ready for use. Fig. 2 is a longitudinal sectional view taken through the center of the brush, showing the galvanic pile or battery in position and the electric conductors thereof; and Fig. 3 is a diagrammatical view of the brush, showing the course of the electric current.

Similar letters refer to like parts throughout the different views of the drawings.

A represents the body of the brush, and is provided with a handle A' at one of its ends and with a recess or cavity $a$ for the reception and retention of the battery. The top of the cavity $a$ is closed by means of a cover B, which is removably attached to the body A in any suitable manner. In the present instance, however, I have shown the cover as provided in its ends with the plain slot $b$ and the open slot or notch $b'$. These are to receive suitable screws $c$ and $c'$, secured in the upper surface of the body near its ends, as is clearly seen in Figs. 1 and 2 of the drawings. The distance between the inner end of the plain slot $b$ and the outer or remote end of the cover is less than the distance between the screws. The screw $c'$ is a thumb or set screw and may be loosened, so that the cover B can be moved toward the handle until the open slot $b'$ in the other end thereof is disengaged from the plain screw $c$, when said cover may be turned to one side to admit of the insertion or removal of the battery E, or by removing said thumb-screw $c'$ the cover can be removed entirely. Said battery preferably consists of a series of metallic pieces $e$ of zinc and $e'$ of copper, placed alternately one on the other and secured together, so as to form a chain or jointed battery. Between the plates $e$ and $e'$, which are arranged in pairs, is placed a piece of felt $e^2$ or other absorbent material, which may be saturated with suitable acid to cause oxidation of the metals. While I prefer to use pieces $e$ and $e'$, made of zinc and copper, respectively, yet I may employ any other suitable material. To the ends of the battery or galvanic pile E are attached plates $e^3$, provided with open slots in their outer ends, through which are passed thumb-screws $g$ and $g'$, which engage suitable sockets $h$ and $h'$, set in the lower surface of the body of the brush. By this means when the thumb-screws are loosened the slotted end plates $e^3$ and the entire battery can be removed from the cavity $a$, as for cleansing or recharging. Passing through the lower surface of the brush-body, but out of contact with the screws $g$ and $g'$, are a number of bristles H, made of very fine and ductile wire and preferably of copper or some other good electric conducting material. As shown in Fig. 2, these wire bristles are placed and secured in bunches and extend through the lower surface of the body into the cavity $a$ thereof, where they are all connected by means of a wire or conductor G, one end of which wire is secured to the metal socket $h'$ for one of the thumb-screws $g'$, used for securing the battery in position. Placed above the inner portions of the bunches of bristles H, over the conductor G, around the other socket $h$, and within the cavity of the body of the brush is an insulating-covering I, which is also acid-proof to prevent any part of the acid in which the battery may have been immersed from passing through to the bristles, and thereby injuring the same or reaching the flesh of the person upon whom the brush is being used.

On the upper surface of the handle A' is secured a metal plate $a'$, to which is connected a conductor G', which is secured at its other end to the socket-piece $h$ and above the insulating-covering I or on the surface thereof upon which the battery rests. Surrounding the bunches of bristles H and secured on the lower surface of the body of the brush are a series of bunches of animal bristles H', which are employed to shield and protect the metallic bristles, the latter being more ductile and less flexible than the animal bristles, and therefore liable to become crushed or pressed into a tangled mass unless some protection is afforded.

From the foregoing and by reference to the drawings it will be seen and clearly understood that the subject by grasping the handle A' with one hand and placing the bristles on his body or flesh completes an electric circuit and a continuous flow of the current is produced.

When the brush is operated with by another person, it is apparent that one hand of the operator must be placed in contact with the flesh of the subject being operated on, while the other hand grasps the handle of the brush, the bristles of which are also placed in contact with the flesh or skin of the subject, which operation will complete the electric circuit.

Having thus fully described my invention, what I claim as new, and desire to secure by Letters Patent, is—

1. In an electric brush, the combination with the body having a cavity in its upper face and a handle carrying a contact-plate, bristles set in the lower face of the body, two metal sockets set in the base of the cavity but out of contact with the bristles, a conductor connecting the latter with one of said sockets, and an insulating and waterproof covering over the conductor and the upper ends of the bristles; of a wire connecting said handle contact-plate with the other socket, a battery located within said cavity above the insulation, and means for connecting its poles with the two sockets, as and for the purpose set forth.

2. In an electric brush, the combination with the body having a cavity in its upper face and a contact-plate, bristles set in the lower face of said body, two metal sockets set in the base of the cavity, means for electrically connecting the bristles with one of the sockets, and an insulating and waterproof covering over the upper ends of the bristles; of an electrical connection between the contact-plate and the other socket, a battery located within said cavity above the insulation and whose poles have plates provided with outwardly-opening slots and are adapted to engage said sockets, and thumb-screws removably connecting said slotted plates with the sockets, as and for the purpose set forth.

EMMA M. HELLWIG.

Witnesses:
CHAS. C. TILLMAN,
E. F. DUGGAN.